(12) United States Patent
Glenn (10) Patent No.: US 11,408,792 B2
(45) Date of Patent: Aug. 9, 2022

(54) HYBRID PRESSURE CALIBRATION

(71) Applicant: Baker Hughes Holdings LLC, Houston, TX (US)

(72) Inventor: Jacob Glenn, Houston, TX (US)

(73) Assignee: BAKER HUGHES HOLDING LLC, Houston, TX (US)

(*) Notice: Subject to any disclaimer, the term of this patent is extended or adjusted under 35 U.S.C. 154(b) by 0 days.

(21) Appl. No.: 17/116,515

(22) Filed: Dec. 9, 2020

(65) Prior Publication Data

US 2022/0178779 A1 Jun. 9, 2022

(51) Int. Cl.
*G01L 27/00* (2006.01)
*G01L 19/08* (2006.01)

(52) U.S. Cl.
CPC ............ *G01L 27/005* (2013.01); *G01L 19/08* (2013.01); *F04B 2207/70* (2013.01)

(58) Field of Classification Search
CPC ..... G01L 27/005; G01L 19/08; F04B 2207/70
See application file for complete search history.

(56) References Cited

U.S. PATENT DOCUMENTS

| 2012/0298381 A1* | 11/2012 | Taylor | ............... A62C 35/64 73/1.72 |
| 2015/0226628 A1* | 8/2015 | Stering | ............... G01L 27/005 73/1.63 |
| 2018/0017460 A1* | 1/2018 | Batista | ............... G01F 25/0092 |

FOREIGN PATENT DOCUMENTS

DK 0694774 A1 * 1/1996

* cited by examiner

*Primary Examiner* — Ryan D Walsh
(74) *Attorney, Agent, or Firm* — Mintz Levin Cohn Ferris Glovsky and Popeo, PC; Lisa Adams (57) ABSTRACT

A pressure calibration system includes a manual pump and pressure adjustment subsystem. The pump outputs pressurized fluid to the adjustment subsystem in response to manual actuation. The adjustment subsystem is configured to automatically adjust the pressure in fine increments after the manual pump pressurizes the fluid within a tolerance range of a pressure set point. A user interface is further configured generate annunciations regarding the fluid pressure.

18 Claims, 6 Drawing Sheets

FIG. 5 (con't)

HYBRID PRESSURE CALIBRATION

BACKGROUND

Pressure vessels are commonly employed to hold fluids (e.g., gases, liquids) at a pressure different than atmospheric pressure. Pressure vessels can be further equipped with pressure sensors for measuring the pressure of the fluid therein and confirming that the fluid pressure is within a desired pressure range. In this manner, hazards associated with overpressure (e.g., leakage, rupture, injury, etc.) can be avoided. Furthermore, monitoring the pressure over time can identify potential leaks and avoid environmental contamination.

SUMMARY

The pressure sensors employed with pressure vessels can be periodically subjected to calibration testing to ensure that the measured pressure is accurate. As an example, the pressure vessel receives a fluid at a known set point pressure value and the set point pressure is held. The fluid pressure measured by the pressure sensors of the pressure vessel is compared to the set point pressure. Under circumstances where the measured fluid pressure deviates from the set point pressure by greater than a threshold tolerance, the pressure sensors can be adjusted such that the measured pressure is approximately equal to the set point pressure. This process can be repeated at multiple set points, ascending and/or descending in pressure, to calibrate the pressure sensors of the pressure vessel over a desired operating pressure range.

Different techniques have been developed for pressurizing the fluid received by the pressure vessel to the set point pressure. In one aspect, a hand pump can be manually operated to pressurize the fluid received by the pressure vessel. The fluid can be pressurized to a pressure that slightly exceeds the set point pressure. Subsequently, the fluid pressure is reduced to be approximately equal to the set point pressure (e.g., using a let-down valve).

However, it can be appreciated that hand pumps can require manual adjustment to compensate for adiabatic effects or system leaks. In general, compressing a gas results in temperature rise of the gas due to friction effects, which leads to density change of the gas. This density change affects the pressure of a fixed volume of gas. Once the gas has been compressed to the desired pressure the temperature then slowly drops back towards ambient, again affecting the density and thus pressure of the gas. This can be seen as a slow reduction of the pressure until it settles to ambient temperature, which is very hard to initially distinguish from a leak in the system. While these adiabatic effects can be compensated for by further manually actuation of the hand pump, such compensation starts the entire error cycle again, which can be labor-intensive and introduce instability and/or noise into pressure measurements.

In another aspect, an electrically operated pump can be employed in combination with various valves and adjustment mechanisms to automatically control the fluid pressure to approximately equal the set point pressure. Aside from on-site setup and initiating the calibration process, automated pumps do not require an operator, which can reduce labor costs as compared to manually actuated hand pumps. Furthermore, automated pumps can be capable of automatically compensating for pressure leaks, which commonly occur in existing pressure vessels, as well as adiabatic effects.

However, fully automatic pumps also have drawbacks. Automatic pumps can consume a large amount of power and require relatively large capacity batteries. This leads to automatic pumps being relatively heavy. Also, even with large capacity batteries, automatic pumps can be power-limited, so generating pressure into a vessel of significant volume can be relatively slow. Furthermore, automatic pumps can contain a high number of moving parts that require high precision. Thus, the life/reliability/service interval of automatic pumps can be much worse than manual pumps.

Accordingly, systems and methods are provided for improved pressure calibration. As discussed in greater detail below, a hybrid pressure calibration system is provided which includes a manually actuated pump for pressurizing a fluid to a bulk pressure and a fully automated pressure adjustment subsystem for fine control of the fluid pressure to achieve and maintain a pressure set point. In this manner, pressure changes due to system leaks and/or adiabatic effects can be automatically adjusted for.

As discussed in greater detail below, the pressure calibration system can include one or more pressure sensors and an adjustable volume configured for fluid communication with the manual pump and a pressure vessel. As the manual pump generates bulk pressure, the fluid pressure within the pressure calibration system is measured by the pressure sensors. Once the measured fluid pressure is approximately equal to a pressure set point, the pressure calibration system can notify the user to stop manual pressurization of the fluid. Subsequently, the pressure calibration system can control the volume of the adjustable volume pressure for fine control of the fluid pressure to maintain the pressure set point.

Once the fluid pressure is stably maintained at the pressure set point, a vessel pressure within the pressure vessel can be measured by one or more vessel pressure sensors of the pressure vessel. This sequence can be repeated for multiple pressure set points, whether ascending to a peak pressure or descending from the peak pressure. For descending pressure set points, pressure reduction can be performed in a fully automatically manner, with no user action required. Erroneous calibration of the vessel pressure sensor(s) can be detected when differences between the one or more pressure set points and corresponding vessel pressure measurements exceed a calibration tolerance.

In certain embodiments, the pressure calibration system can be further configured to provide a calibration adjustment for the vessel pressure sensor(s). Under circumstances where an erroneous calibration is detected, the pressure calibration system can determine an adjustment for the vessel pressure sensor(s). When the adjustment is applied to the vessel pressure sensor(s), calibration errors can be corrected so that the measured vessel pressure and the measured calibration system pressure are approximately equal, within the calibration tolerance.

In an embodiment, a pressure calibration system is provided and includes a manual pump, a pressure adjustment subsystem, and a user interface. The manual pump can be configured to receive a fluid from a fluid source and output the received fluid in response to manual actuation of the pump by an operator. The pressure adjustment subsystem can include a manifold, an adjustable chamber at least one first pressure sensor, and a pressure controller. The manifold can include a plurality of channels extending between an inlet and a first outlet. The inlet can be in fluid communication with the manual pump for receipt of the fluid. The first outlet can be configured for fluid communication with a pressure vessel. The adjustable chamber can be in fluid communication with the plurality of channels and it can include an actuator. The actuator can be configured to move so as to increase or decrease the adjustable chamber volume in response to receipt of a command signal. The at least one first pressure sensor can be configured to measure a manifold pressure of the fluid received within the manifold from the manual pump and output a manifold pressure signal representing the measured manifold pressure. The pressure controller can include at least one processor. The at least one pressure controller can be configured to receive the manifold pressure signal from the at least one first pressure sensor. The at least one pressure controller can also be configured to output a first notification signal when the manifold pressure is within a first tolerance range about a pressure set point and outside of a second tolerance range about the pressure set point. The first notification signal can represent an instruction for the operator to cease manual actuation of the manual pump. The at least one pressure controller can be further configured to transmit at least one first command signal to the adjustable chamber following output of the first notification signal. When the manifold pressure is less than the pressure set point, the first command signal can be configured to command the actuator to move and decrease the adjustable chamber volume. When the manifold pressure is greater than the pressure set point, the first command signal can be configured to command the actuator to move and increase the adjustable chamber volume. The user interface can be in electrical communication with the pressure adjustment subsystem and it can be configured to receive notification signals from the pressure adjustment subsystem and to generate corresponding annunciations.

In an embodiment, the pressure controller can be further configured to output a second notification signal to the user interface for annunciation when the manifold pressure is within the second tolerance range about the pressure set point. Annunciation of the second notification signal can represent achievement of the pressure set point within the manifold.

In an embodiment, the user interface can be further configured to receive input of the pressure set point and transmit the pressure set point to the pressure controller.

In an embodiment, manifold can further include a second outlet in fluid communication with the plurality of channels, a first normally open valve positioned within the plurality of channels adjacent to the first outlet, and a second normally closed valve positioned within the plurality of channels adjacent to the second outlet. The first and second valves can be configured to open and close in response to at least one second command signal.

In an embodiment pressure controller is configured to output the at least one second command signal to the first and second valves when the manifold pressure is greater than a safety pressure, the at least one second command signal being configured to cause the first valve to close, and to cause the second valve to open.

In an embodiment, the pressure controller can be further configured to output a third notification signal to the user interface device when the manifold pressure is greater than the safety pressure. Annunciation of the third notification can represents an overpressure condition.

In an embodiment, the pressure controller can be further configured to receive, from at least one second pressure sensor in fluid communication with a pressure vessel, a vessel pressure signal. The vessel pressure signal can represent a vessel pressure measured within a pressure vessel in fluid communication with the first outlet.

In an embodiment, the pressure controller can be further configured to output a fourth notification signal to the user interface when the magnitude of a difference between the vessel pressure and the manifold pressure is greater than a calibration tolerance. Annunciation of the fourth notification can represent an incorrect calibration of the at least one second pressure sensor.

In an embodiment, the pressure controller can be further configured to determine, the magnitude of a difference between the vessel pressure and the manifold pressure. The pressure controller can also be configured to generate, when the determined difference is greater than a calibration threshold, a calibration update based upon the determined magnitude difference. The pressure controller can additionally be configured to transmit the calibration update to the at least one second pressure sensor. The calibration update can be configured to recalibrate the at least one second pressure sensor upon receipt to output an updated vessel pressure signal that represents a vessel pressure which is approximately equal to the manifold pressure.

In an embodiment, a method of pressure calibration is provided. The method can include receiving, by a manual pump, a fluid received from a fluid source. The method can also include outputting, by the manual pump in response to manual actuation by an operator, the received fluid to an inlet of a manifold. The manifold can include a plurality of channels extending between the inlet and a first outlet configured for fluid communication with a pressure vessel. The method can also include measuring, by at least one first pressure sensor, a manifold pressure of the fluid received within the manifold from the manual pump. The method can also include outputting, by at least one first pressure sensor, a manifold pressure signal representing the measured manifold pressure. The method can further include receiving, by a pressure controller including at least one processor, the manifold pressure signal. The method can additionally include outputting, by the pressure controller, a first notification signal when the manifold pressure is within a first tolerance range about a pressure set point and outside of a second tolerance range about the pressure set point. Annunciation of the first notification signal represents an instruction for the operator to cease manual actuation of the manual pump. The method can further include transmitting, by the pressure controller, at least one first command signal to an adjustable chamber following output of the first notification signal. The adjustable chamber can include an actuator configured to move so as to increase or decrease the chamber volume in response to receipt of the at least one first command signal. When the manifold pressure is less than the pressure set point, the first command signal can be configured to command the actuator to move and decrease the chamber volume. When the manifold pressure is greater than the pressure set point, the first command signal can be configured to command the actuator to move and increase the chamber volume. The method can additionally include generating, by a user interface, annunciations in response to receipt of notification signals from the pressure controller.

In an embodiment, the method can further include outputting, by the pressure controller, a second notification signal to the user interface when the manifold pressure is within the second tolerance range about the pressure set point, and annunciating, by the user interface, the second notification signal to communicate achievement of the pressure set point within the manifold.

In an embodiment, the method can further include receiving, by user interface, input of the pressure set point, and transmitting, by the user interface, the pressure set point to the pressure controller.

In an embodiment, the manifold can further include a second outlet in fluid communication with the plurality of channels, a first normally open valve positioned within a first portion of the plurality of channels adjacent to the first outlet, and a second normally closed valve positioned within a second portion of the plurality of channels adjacent to the second outlet. The first and second valves can be configured to open and close in response to at least one second command signal.

In another embodiment, the method can further include outputting, by the pressure controller, the at least one second command signal to the first and second valves when the manifold pressure is greater than a safety pressure. The method can also include closing the first valve in response to receipt of the at least one second command signal. The method can additionally include opening the second valve in response to receipt of the at least one second command signal.

In another embodiment, the method can include outputting, by the pressure controller, a third notification signal when the manifold pressure is greater than the safety pressure, and annunciating, by the user interface, the third notification to communicate an overpressure condition.

In another embodiment, the method can further include comprising receiving, by the pressure controller from at least one second pressure sensor in fluid communication with a pressure vessel, a vessel pressure signal representing a vessel pressure measured within a pressure vessel in fluid communication with the first outlet.

In another embodiment, the method can further include outputting, by the pressure controller, a fourth notification signal when the magnitude of a difference between the vessel pressure and the manifold pressure is greater than a calibration tolerance, and annunciating, by the user interface, the fourth notification to communicate detection of an incorrect calibration of the at least one second pressure sensor.

In another embodiment, the method can further include determining, by the pressure controller, the magnitude of a difference between the vessel pressure and the manifold pressure. The method can also include generating, by the pressure controller when the determined difference is greater than a calibration threshold, a calibration update based upon the determined magnitude difference. The method can additionally include transmitting, by the pressure controller, the calibration update to the at least one second pressure sensor. The calibration update can be configured to recalibrate the at least one second pressure sensor upon receipt to output an updated vessel pressure signal representing a vessel pressure that is approximately equal to the manifold pressure.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

It is common to measure the pressure contained within pressure vessels. As an example, pressure measurements can be performed for safety, ensuring that a pressure vessel does not rupture due to overpressure. Pressure measurements can be made by pressure sensors, and these pressure sensors can be calibrated so that they accurately measure the pressure within the pressure vessel. Embodiments of the present disclosure provide a hybrid pressure calibration system configured to test and correct the calibration of pressure sensors. The hybrid pressure calibration system includes a manual pump and pressure adjustment subsystem. The pump outputs pressurized fluid to the adjustment subsystem in response to manual actuation. The adjustment subsystem is configured to automatically adjust the pressure in fine increments after the manual pump pressurizes the fluid within a tolerance range of a pressure set point. A user interface is further configured generate annunciations regarding the fluid pressure.

Figure 1:
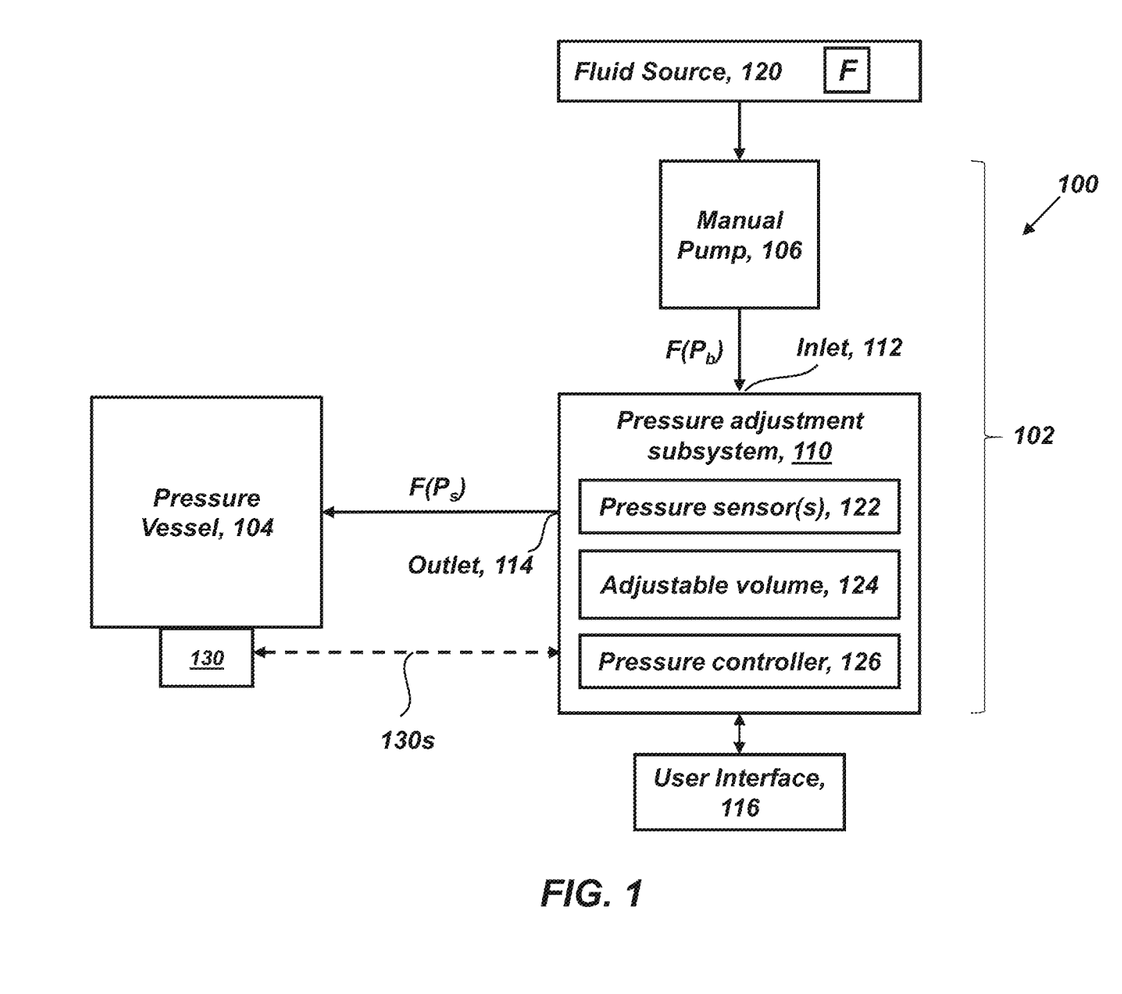
FIG. 1 is a diagram illustrating one exemplary embodiment of an operating environment including a hybrid pressure calibration system in fluid communication with a pressure vessel.

FIG. 1 is a diagram of an operating environment 100 illustrating one exemplary embodiment of a hybrid pressure calibration system 102 in fluid communication with a pressure vessel 104. The pressure vessel 104 can be any structure capable of containing a fluid at a pressure different from the surrounding environment (e.g., tanks, pipes, etc.) As shown, the hybrid pressure calibration system 102 includes a manual pump 106, a pressure adjustment subsystem 110, a fluid inlet 112, a fluid outlet 114, and a user interface 116. The pressure adjustment subsystem 110 is in fluid communication with the manual pump 106 and is in electrical communication with the user interface 116.

Embodiments of the manual pump 106 can include hand-operated pumps, such as hydraulic pumps and pneumatic pumps. The manual pump 106 is in fluid communication with a fluid source 120 including a fluid F to be pressurized. The fluid can be any gas or liquid. Embodiments of the fluid source 120 can adopt a variety of configurations. In one example, the fluid source 120 can be an environment surrounding the hybrid pressure calibration system 102 with the fluid at atmospheric pressure, such as air. In another example, the fluid source 120 can be an enclosed volume containing the fluid at a predefined pressure.

In operation, the manual pump 106 can be configured to draw fluid F from the fluid source 120 and raise the pressure of the fluid F to a bulk pressure $P_b$ in response to manual actuation. The pressurized fluid at the bulk pressure $F(P_b)$ can be output to the pressure adjustment subsystem 110 via the fluid inlet 112.

As further shown, the pressure adjustment subsystem 110 includes one or more pressure sensors 122, an adjustable volume chamber 124, and a pressure controller 126 including one or more processors. The fluid F received by the pressure adjustment subsystem 110 is stored within the adjustable volume chamber 124. The one or more pressure sensors 122 are fluid communication with the adjustable volume chamber 124 and are configured to measure the pressure of the fluid F stored therein. The one or more pressure sensors are further configured to output respective pressure signals to the pressure controller 126 representing the measured fluid pressure.

The pressure controller 126 can receive the pressure signals and a pressure set point $P_s$ (e.g., via user input to the user interface 116). When the measured fluid pressure within the pressure adjustment subsystem 110 is within a first tolerance range of a pressure set point $P_s$, the pressure controller 126 can generate and transmit a notification to the user interface 116. The user interface 116 can subsequently annunciate the notification to communicate that manual actuation of the pump 106 can be halted.

The hybrid pressure calibration system 102 (e.g., the pressure controller 126) can also be in communication with one or more vessel pressure sensors 130 of the pressure vessel 104. The vessel pressure sensors 130 can be configured to measure the pressure of the fluid received from the hybrid pressure calibration system 102 and output vessel measurement signals 130s to the pressure controller 126. The pressure controller 126 can compare the measured vessel pressure to the pressure set point $P_s$. If a difference between the measured vessel pressure and the calibration pressure set point $P_s$ exceeds a calibration threshold, the pressure controller 126 can determine that the calibration of the vessel pressure sensors 122 is erroneous.

Under circumstances where the calibration of the vessel pressure sensors 130 are determined to be erroneous, embodiments of the pressure controller 126 can be further configured to determine a calibration adjustment. The calibration adjustment can be further output to the vessel pressure sensors 130. The calibration adjustment can be effective to update a calibration of the vessel pressure sensors 130 such that the output of the vessel pressure sensors 130 is approximately equal to the pressure set point $P_s$.

Controlling the pressure of fluid output to the pressure vessel at the pressure set point $P_s$ in this manner is a hybrid approach that combines the low operating cost benefits of manual pumping with fully automated pressure adjustment and hold capability, allowing for automated compensation for adiabatic effects and attendant improvements in pressure stability.

Figure 2:
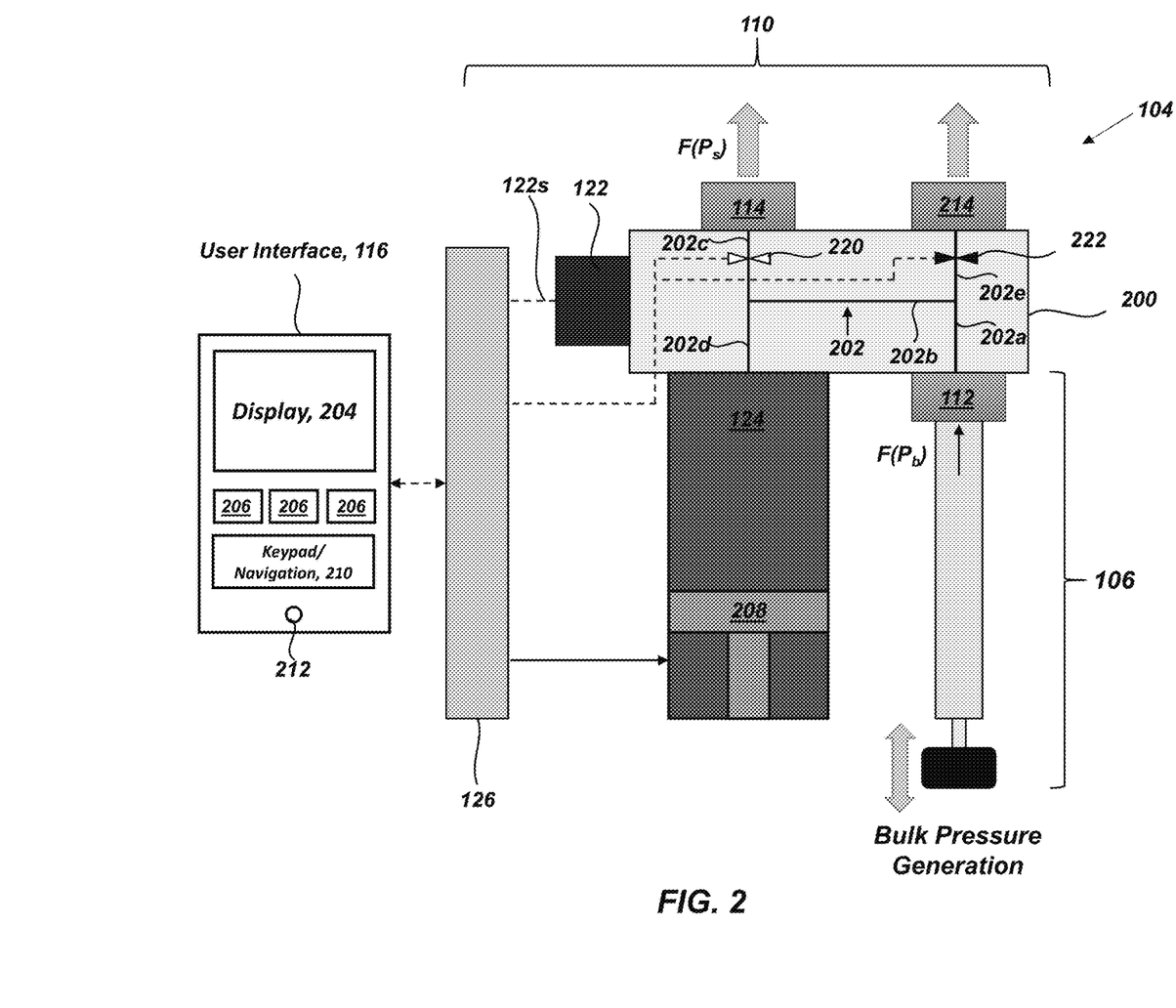
FIG. 2 is a schematic diagram illustrating the hybrid pressure calibration system of FIG. 1 in greater detail.

One exemplary embodiment of the hybrid pressure calibration system 102 is discussed in greater detail below with regards to FIG. 2. As discussed above, bulk pressure is generated by user actuation of the manual pump. The pressurized fluid at the bulk pressure $F(P_b)$ can be output by the manual pump 106 and received at the fluid inlet 112 of the hybrid pressure calibration system 102.

The received fluid can further flow into the pressure adjustment subsystem 110. As shown in FIG. 2, the pressure adjustment subsystem 110 includes a manifold 200 having a plurality of channels 202 in fluid communication with each of the fluid inlet 112, the fluid outlet 110, and the adjustable volume chamber 124. For example, the plurality of channels 202 can include channel segments 202a, 202b, 202c, 202d and 202e. The channel segments 202a, 202b, 202c can form a first fluid pathway extending from the fluid inlet 112 to the fluid outlet 114. The channel segment 202d can extend from the adjustable volume chamber 124 to the first fluid pathway.

The one or more pressure sensors 122 can be configured to measure a manifold pressure of the fluid output from the manual pump 106 and received within the manifold 200. As an example, the one or more pressure sensors 122 can be placed within the plurality of channels and/or within the adjustable volume chamber 124. The one or more pressure sensors 122 can be further configured to output one or more manifold pressure signals 122s representing the measured manifold pressure. The manifold pressure signal 122s can be output to the pressure controller 126.

The user interface 116 can include one or more user interface objects configured to receive information input by a user and to display information. As an example, the user interface 116 can include one or more of a display 204, hard keys 206, keypad or other navigation objects 210 (e.g., directional arrows), and indicators 212 (e.g., speakers, lights, etc.) In one embodiment, the user interface 116 can receive input of the predetermined pressure set point $P_s$ by a user. In other embodiments, the display 204 can be configured to display the manifold pressure. In further embodiments, the indicators 212 can activate for annunciation.

The pressure controller 126 can include one or more processors configured to receive the pressure set point $P_s$ and compare the measured manifold pressure (e.g., bulk pressure $P_b$) to the pressure set point $P_s$. The pressure controller 126 can further receive a first pressure tolerance range and a second pressure tolerance range, each about the pressure set point $P_s$. The second pressure tolerance range can be less than the first pressure tolerance range.

The pressure controller 126 can be further configured to compare the measured manifold pressure to the pressure set point $P_s$ in view of the first and second tolerances. In one embodiment, when the pressure controller 126 determines that the measured bulk pressure $P_b$ is outside of the first tolerance range and the second pressure tolerance range, the pressure controller 126 can generate and transmit at least one notification (e.g., a second notification) to the user interface 116 for annunciation. The annunciation corresponding to this notification can be any audible and/or visual indications (e.g., 212) that represent an instruction for the operator to continue actuation of the manual pump 106.

When the pressure controller 126 determines that the measured bulk pressure $P_b$ is within the first tolerance range and outside of the second pressure tolerance range, the pressure controller 126 can generate and transmit at least one notification (e.g., a first notification) to the user interface 116 for annunciation. The annunciation corresponding to the first notification(s) can be any audible and/or visual indications (e.g., 212) that represent an instruction for the operator to cease actuation of the manual pump 106.

The pressure adjustment subsystem 110 can be configured to automatically adjust the manifold pressure to the set point pressure $P_s$. These pressure changes can be relatively fine, providing relatively small changes the received fluid pressure, as compared to pressure changes resulting from actuation of the manual pump 106. In this manner, the pressure adjustment subsystem 110 can control the received pressure to be approximately equal to the calibration pressure set point $P_s$, within a relatively small margin of error (e.g., within the second tolerance range). Thus, the fluid pressure at the pressure set point $P_s$ can be stably output to the pressure vessel 104.

In an embodiment, the adjustable volume chamber 124 can be in fluid communication with the plurality of channels 202 and includes an actuator 208. The actuator 208 can be configured to move in response to receipt of a command signals so as to increase or decrease the volume of the chamber. In certain embodiments, the actuator 208 is a piston. However, in alternative embodiments, the actuator can adopt other forms without limit.

The pressure controller 126 can generate one or more first commands to move the actuator 208 to cause the manifold pressure to change based upon the comparison of manifold fluid pressure to the pressure set point $P_s$. As an example, when the manifold pressure is less than the pressure set point $P_s$, the first command signals can be configured to command the actuator 208 to move such that the chamber volume decreases. The decrease in chamber volume results in an increase in the manifold pressure. Conversely, when the manifold pressure is greater than the pressure set point, the first command signals can be configured to command the actuator 208 to move such that the chamber volume increases. The increase in chamber volume results in a decrease in the manifold pressure. Once the fluid pressure is approximately equal to the pressure set point $P_s$, the pressure controller 126 can generate second commands operative to cause further movement of the actuator 208 so as to maintain the manifold at about the pressure set point $P_s$.

When the pressure controller 126 determines that the measured manifold pressure is within the first tolerance range and the second pressure tolerance range, the pressure controller 126 can generate and transmit at least one notification (e.g., a second notification) to the user interface 116 for annunciation. The annunciation corresponding to the first notification(s) can be any audible and/or visual indications (e.g., 212) that represents achievement of the pressure set point within the manifold.

It can be appreciated that the amount of travel of the actuator 208 is limited, which also limits the magnitude of pressure increases or decreases that can be provided by the adjustable volume chamber 124. While the manual pump 106 can be used in lieu of the adjustable volume chamber 124 for relatively large increases in manifold pressure, the pump 106 cannot reduce the manifold pressure. Accordingly, in further embodiments, the hybrid pressure calibration system 102 can include a venting mechanism configured to reduce the manifold pressure.

The ability to reduce the manifold pressure by a large magnitude can provide multiple benefits. In one aspect, the venting mechanism can be used when conducting calibration tests of the pressure vessel 104 where the pressure set point $P_s$ is successively decreased. In another aspect, the venting mechanism can be used for pressure relief when the pressure controller determines that the measured manifold pressure exceeds a safety threshold. The ability to inhibit development of overpressure can protect the hybrid pressure calibration system from damage, as well as operators from injury.

In an embodiment, the venting mechanism can include a second outlet 214 in fluid communication with the plurality of channels 202, a first valve 220 positioned within a the plurality of channels 202 adjacent to the first outlet 114 (e.g., within the channel segment 202c), and a second valve (e.g., a normally closed valve) positioned within the plurality of channels adjacent to the second outlet (e.g., the channel segment 202e). As shown, the channel segment 202e extends from the channel segment 202a to the second outlet 214. The first and second valves 220, 222 are configured to open and close in response to at least one second command signal from the pressure controller 126.

In a first mode of operation to increase the manifold pressure, the first valve 220 is open and the second valve 222 is closed, allowing communication of the pressurized fluid from the hybrid pressure calibration system 102 to the pressure vessel 104. In contrast, in a second mode of operation to decrease the manifold pressure by a large magnitude, the pressure controller 126 can generate and transmit at least one second command signal to the first and second valves 220, 222. The at least one second command signal can be operative to cause the first valve to close and the second valve to open. So configured, the pressurized fluid is directed to the second outlet 222, rather than the first outlet 220. Similar to the increasing pressure operations discussed above, once the pressure controller 126 determines that the manifold pressure is within a predetermined tolerance range of the pressure set point $P_s$, the adjustable volume chamber 124 can be employed to make fine changes of the manifold pressure.

Figure 3:
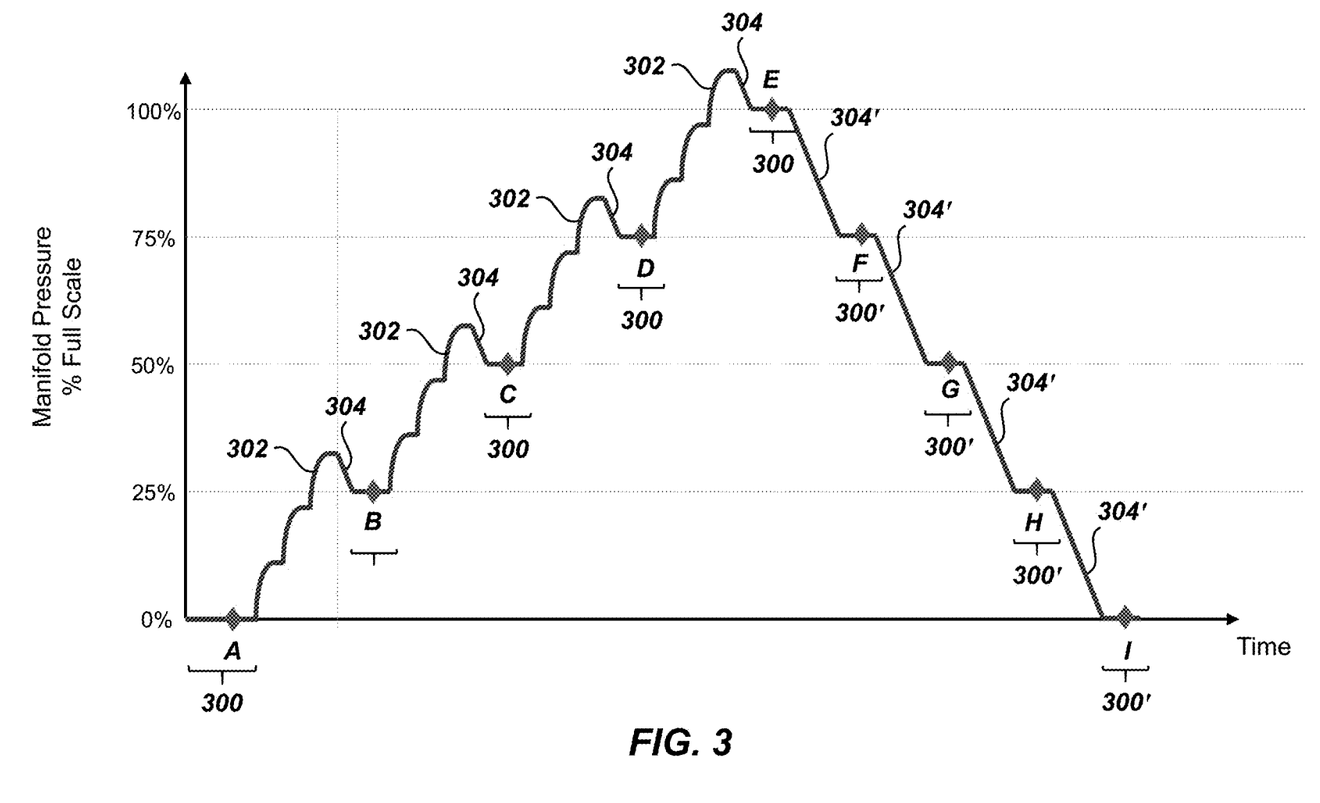
FIG. 3 is a plot of measured calibration pressure as a function of time.

During a use of the hybrid pressure calibration system 102 to evaluate the calibration of the vessel pressure sensors 130, the hybrid pressure calibration system 102 can output pressurized fluid to the pressure vessel 104 at a plurality of set points in succession and receive corresponding measurements of the vessel pressure. FIG. 3 is a plot of the manifold pressure (% full scale) of pressurized fluid output to the pressure vessel 104 as a function of time. Pressure set points $P_s$ are illustrated as diamonds. The plurality of ascending pressure set points are labeled as A (0%), B (25%), C (50%), D (75%), the pressure set point at the peak is labeled as set point E (100%), and plurality of descending pressure set points are labeled as F (75%), G (50%), H (25%), I (0%).

As shown, the manifold pressure starts at set point A (0%) and is maintained for a hold period 300. A vessel pressure measurement is acquired by the vessel pressure sensor 130 during the hold period 300. Subsequently, the manifold pressure is increased to set point B (25%) using the manual pump 106 in combination with the adjustable volume chamber 124. The manifold pressure rises 302 above the set point B and actuation of the manual pump 106 ceases. Subsequently, the manifold pressure decreases due to auto-adjustment 304 by the pressure adjustment subsystem 110 to the set point B (25%). The sequence of hold 300, vessel pressure measurement, manifold pressure increase 302, and manifold pressure auto-adjustment 304 is repeated for set points C (50%), D (75%) and E (100%).

For the descending pressure set points F (75%), G (50%), H (25%), I (0%), the manifold pressure is reduced from the peak set point E (100%) using the venting mechanism, alone or in combination with the adjustable volume chamber 124. Accordingly, the manual pump 106 is not actuated to achieve the descending pressure set points $P_s$. Instead, only hold 300', vessel pressure measurement, and manifold pressure auto-adjustment 304' is repeated.

Using the various vessel pressure measurements acquired by the vessel pressure sensors 122, the hybrid pressure calibration system 102 can be further configured to determine whether the vessel pressure sensors 130 are within calibration or not. As discussed above with regards to FIG. 1, the hybrid pressure calibration system 102 (e.g., the pressure controller 126) can receive the vessel pressure signals 130s output by the vessel pressure sensor 130. The pressure controller 126 can compare the vessel pressure signals 130s to the corresponding pressure set point $P_s$ (e.g., as represented by the manifold pressure signals 122s).

Figure 4:
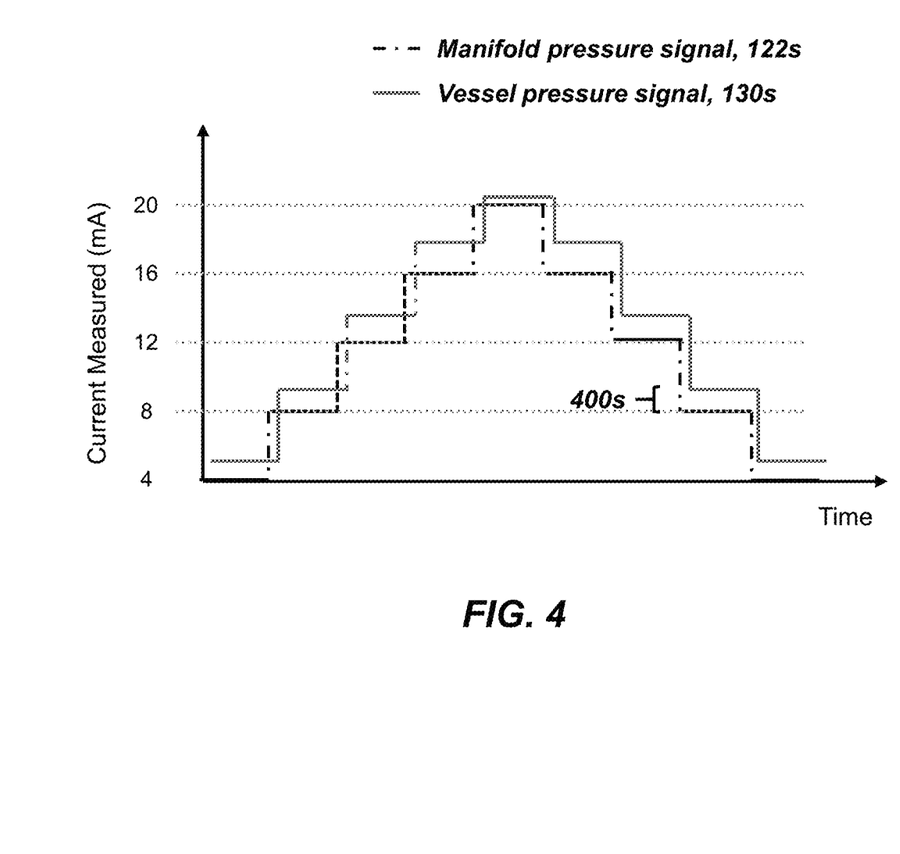
FIG. 4 is a schematic plot of measured current output by the pressure sensor of the pressure vessel as a function of time and an ideal current output corresponding to the pressure set point is overlaid for comparison.

Examples of the vessel pressure signals 130s and the manifold pressure signals 122s, can be represented as DC current. The difference between the vessel pressure signals 130s and pressure set points $P_s$ (manifold pressure signals 122s) can represent the error in the calibration of the vessel pressure sensors 130. Thus, the pressure controller 126 can generate an adjustment signal 400s for transmission to the vessel pressure sensors 130. The adjustment signal 400s can be applied by the vessel pressure sensors 130 upon receipt to update their calibration such that the measured vessel pressure is approximately equal to the measured manifold pressure, within the second tolerance range.

It can be appreciated that, while the adjustments signal 400s is discussed above in the context of DC current, the adjustment signal can adopt any form suitable for updating the calibration of the vessel pressure sensors.

Figure 5:
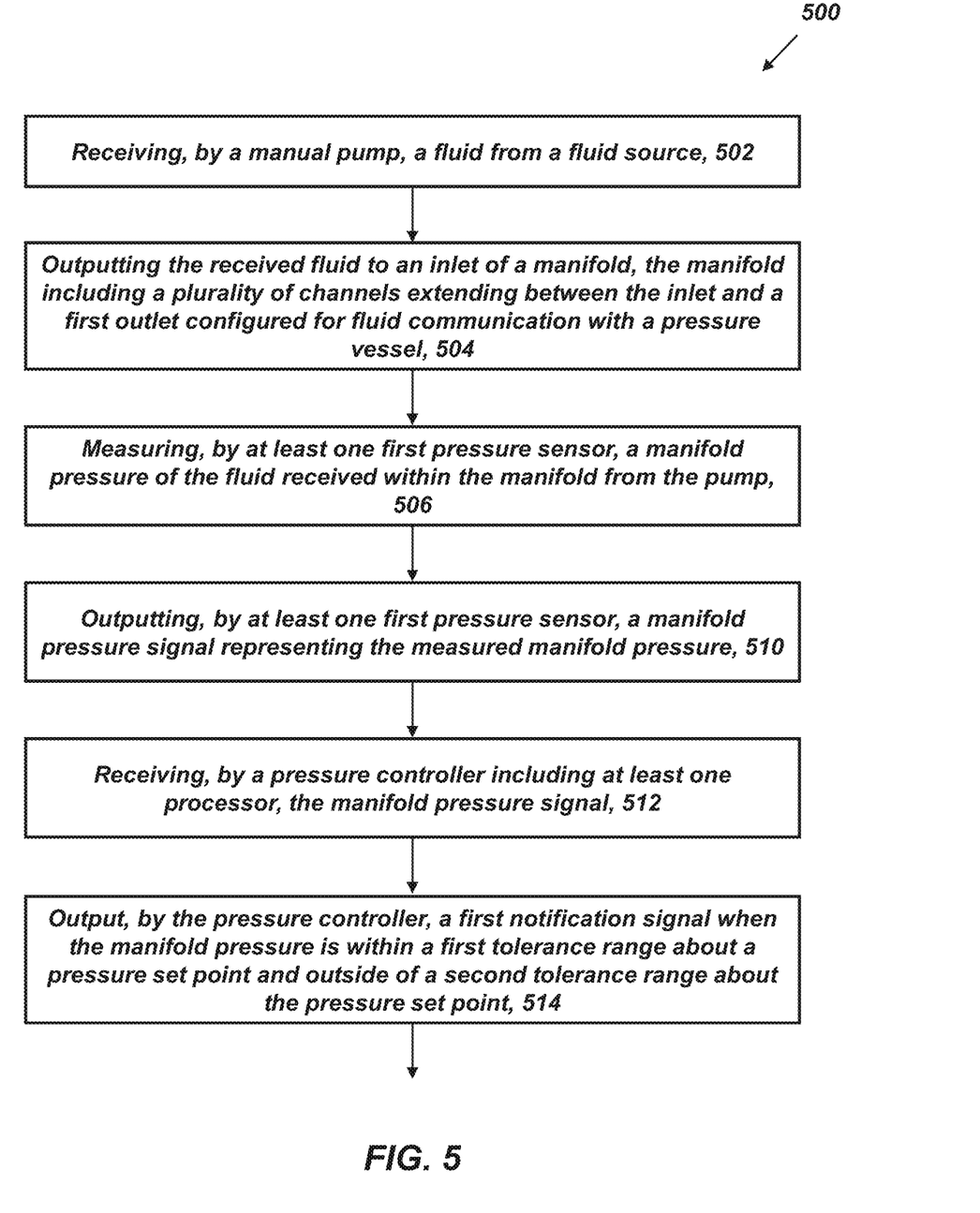
FIG. 5 is a flow diagram illustrating one exemplary embodiment of a method for pressure calibration employing the hybrid pressure calibration system of FIGS. 1-3.

A method 500 of pressure calibration employing embodiments of the hybrid pressure calibration system 102 is illustrated in FIG. 5. As shown, the method 500 includes operations 502-522. It can be appreciated that alternative embodiments of the method can include greater or fewer operations and the operations can be performed in a different order than illustrated in FIG. 5.

In operation 502, the manual pump 106 receives the fluid F from the fluid source 120.

In operation 504, the manual pump 106 can, in response to manual actuation by an operator, output the received fluid to the inlet 112 of the manifold 200. The manifold can include the plurality of channels 202 extending between the inlet 112 and the first outlet 114. The first outlet 114 can be configured for fluid communication with the pressure vessel 104.

In operation 506, the one or more pressure sensors 122 can measure the manifold pressure of the fluid received within the manifold 200 from the manual pump 106.

In operation 510, the one or more pressure sensors 122 can output a manifold pressure signal representing the measured manifold pressure.

In operation 512, the pressure controller 126 (e.g., one or more processors) can receive the manifold pressure signal.

In operation 514, the pressure controller 126 can output a first notification signal when the manifold pressure is within a first tolerance range about a pressure set point and outside of a second tolerance range about the pressure set point. Annunciation of the first notification signal (e.g., by the user interface 116) can represent an instruction for the operator to cease actuation of the manual pump.

In operation 516, the pressure controller 126 can transmit at least one first command signal to the adjustable volume chamber 124 following output of the first notification signal. The adjustable volume chamber 124 can include an actuator 208 configured to move so as to increase or decrease the chamber volume in response to receipt of the at least one first command signal.

In operation 520a, the first command signal is configured to command the actuator 208 to move and decrease the chamber volume. The operation 420a is performed when the manifold pressure is less than the pressure set point.

In operation 520b, the first command signal is configured to command the actuator 208 to move and increase the chamber volume. The operation 420b is performed when the manifold pressure is greater than the pressure set point.

In operation 522, the user interface 116 generates annunciations corresponding to notifications received from the pressure controller 126.

Exemplary technical effects of the disclosed systems and method can include, but are not limited to, combining manual fluid pumping with automatic adjustment and hold techniques. Automatic adjustments allow for automatic compensation for pressure leaks and/or adiabatic effects, which can be slow, effort-intensive, and unstable or noisy in manual systems. As electrical pressure pumps are power hungry and inherently life-limited parts due to their high number of moving parts and high precision required, avoiding the use of electrical pressure pumps can reduce power consumption increase durability.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A pressure calibration system, comprising:
   a manual pump configured to receive a fluid from a fluid source and output the received fluid in response to manual actuation of the pump by an operator;
   a pressure adjustment subsystem including:
      a manifold including a plurality of channels extending between an inlet and a first outlet, wherein the inlet is in fluid communication with the pump for receipt of the fluid and the first outlet is configured for fluid communication with a pressure vessel;
      an adjustable chamber in fluid communication with the plurality of channels and includes an actuator configured to move so as to increase or decrease the adjustable chamber volume in response to receipt of a command signal;
      at least one first pressure sensor configured to measure a manifold pressure of the fluid received within the manifold from the manual pump and output a manifold pressure signal representing the measured manifold pressure; and
      a pressure controller including at least one processor and configured to:
         receive the manifold pressure signal from the at least one first pressure sensor;
         output a first notification signal when the manifold pressure is within a first tolerance range about a pressure set point and outside of a second tolerance range about the pressure set point, the first notification signal representing an instruction for the operator to cease manual actuation of the manual pump;
         transmit at least one first command signal to the adjustable chamber following output of the first notification signal,
            wherein, when the manifold pressure is less than the pressure set point, the first command signal is configured to command the actuator to move and decrease the adjustable chamber volume, and
            wherein, when the manifold pressure is greater than the pressure set point, the first command signal is configured to command the actuator to move and increase the adjustable chamber volume; and
   a user interface in electrical communication with the pressure adjustment subsystem and configured receive notification signals from the pressure adjustment subsystem and to generate corresponding annunciations.

2. The system of claim 1, wherein the pressure controller is further configured to output a second notification signal to the user interface for annunciation when the manifold pressure is within the second tolerance range about the pressure set point, wherein annunciation of the second notification signal represents achievement of the pressure set point within the manifold.

3. The system of claim 1, wherein the user interface is further configured to receive input of the pressure set point and transmit the pressure set point to the pressure controller.

4. The system of claim 1, wherein the manifold further comprises a second outlet in fluid communication with the plurality of channels, a first normally open valve positioned within the plurality of channels adjacent to the first outlet, and a second normally closed valve positioned within the plurality of channels adjacent to the second outlet, wherein the first and second valves are configured to open and close in response to at least one second command signal.

5. The system of claim 4, wherein pressure controller is configured to output the at least one second command signal to the first and second valves when the manifold pressure is greater than a safety pressure, the at least one second command signal being configured to cause the first valve to close, and to cause the second valve to open.

6. The system of claim 4, wherein the pressure controller is further configured to output a third notification signal to the user interface device when the manifold pressure is greater than the safety pressure, wherein annunciation of the third notification represents an overpressure condition.

7. The system of claim 1, wherein the pressure controller is further configured to receive, from at least one second pressure sensor in fluid communication with a pressure vessel, a vessel pressure signal representing a vessel pressure measured within a pressure vessel in fluid communication with the first outlet.

8. The system of claim 7, wherein the pressure controller is further configured to output a fourth notification signal to the user interface when the magnitude of a difference between the vessel pressure and the manifold pressure is greater than a calibration tolerance, wherein annunciation of the fourth notification represents an incorrect calibration of the at least one second pressure sensor.

9. The system of claim 7, wherein the pressure controller is further configured to:
  determine, the magnitude of a difference between the vessel pressure and the manifold pressure;
  generate, when the determined difference is greater than a calibration threshold, a calibration update based upon the determined magnitude difference; and
  transmit the calibration update to the at least one second pressure sensor;
  wherein the calibration update is configured to recalibrate the at least one second pressure sensor upon receipt to output an updated vessel pressure signal representing a vessel pressure that is approximately equal to the manifold pressure.

10. A method of pressure calibration, comprising:
  receiving, by a manual pump, a fluid received from a fluid source;
  outputting, by the manual pump in response to manual actuation by an operator, the received fluid to an inlet of a manifold, the manifold including a plurality of channels extending between the inlet and a first outlet configured for fluid communication with a pressure vessel;
  measuring, by at least one first pressure sensor, a manifold pressure of the fluid received within the manifold from the manual pump;
  outputting, by at least one first pressure sensor, a manifold pressure signal representing the measured manifold pressure;
  receiving, by a pressure controller including at least one processor, the manifold pressure signal;
  outputting, by the pressure controller, a first notification signal when the manifold pressure is within a first tolerance range about a pressure set point and outside of a second tolerance range about the pressure set point, wherein annunciation of the first notification signal represents an instruction for the operator to cease manual actuation of the manual pump;
  transmitting, by the pressure controller, at least one first command signal to an adjustable chamber following output of the first notification signal, wherein the adjustable chamber includes an actuator configured to move so as to increase or decrease the chamber volume in response to receipt of the at least one first command signal;
  wherein, when the manifold pressure is less than the pressure set point, the first command signal is configured to command the actuator to move and decrease the chamber volume, and
  wherein, when the manifold pressure is greater than the pressure set point, the first command signal is configured to command the actuator to move and increase the chamber volume; and
  generating, by a user interface in response to receipt of notification signals from the pressure controller, annunciations corresponding to received notifications.

11. The method of claim 10, further comprising:
  outputting, by the pressure controller, a second notification signal to the user interface when the manifold pressure is within the second tolerance range about the pressure set point; and
  annunciating, by the user interface, the second notification signal to communicate achievement of the pressure set point within the manifold.

12. The method of claim 10, further comprising:
  receiving, by user interface, input of the pressure set point; and
  transmitting, by the user interface, the pressure set point to the pressure controller.

13. The method of claim 10, wherein the manifold further comprises a second outlet in fluid communication with the plurality of channels, a first normally open valve positioned within a first portion of the plurality of channels adjacent to the first outlet, and a second normally closed valve positioned within a second portion of the plurality of channels adjacent to the second outlet, wherein the first and second valves are configured to open and close in response to at least one second command signal.

14. The method of claim 13, further comprising:
  outputting, by the pressure controller, the at least one second command signal to the first and second valves when the manifold pressure is greater than a safety pressure;
  closing the first valve in response to receipt of the at least one second command signal; and
  opening the second valve in response to receipt of the at least one second command signal.

15. The method of claim 13, further comprising:
  outputting, by the pressure controller, a third notification signal when the manifold pressure is greater than the safety pressure; and
  annunciating, by the user interface, the third notification to communicate an overpressure condition.

16. The method of claim 10, further comprising receiving, by the pressure controller from at least one second pressure sensor in fluid communication with a pressure vessel, a vessel pressure signal representing a vessel pressure measured within a pressure vessel in fluid communication with the first outlet.

17. The method of claim 16, further comprising:
- outputting, by the pressure controller, a fourth notification signal when the magnitude of a difference between the vessel pressure and the manifold pressure is greater than a calibration tolerance; and
- annunciating, by the user interface, the fourth notification to communicate detection of an incorrect calibration of the at least one second pressure sensor.

18. The method of claim 16, further comprising:
- determining, by the pressure controller, the magnitude of a difference between the vessel pressure and the manifold pressure;
- generating, by the pressure controller when the determined difference is greater than a calibration threshold, a calibration update based upon the determined magnitude difference; and
- transmitting, by the pressure controller, the calibration update to the at least one second pressure sensor;
- wherein the calibration update is configured to recalibrate the at least one second pressure sensor upon receipt to output an updated vessel pressure signal representing a vessel pressure that is approximately equal to the manifold pressure.

\* \* \* \* \*